(12) United States Patent
Lampinen et al.

(10) Patent No.: US 9,596,057 B2
(45) Date of Patent: Mar. 14, 2017

(54) METHOD AND APPARATUS FOR PHYSICAL LAYER LINK ADAPTATION BASED ON TRAFFIC PROPERTIES

(75) Inventors: Karl Marko Juhani Lampinen, Oulu (FI); Tapani Westman, Oulu (FI); Ville-Vesa Haikola, Oulu (FI)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1096 days.

(21) Appl. No.: 12/932,459

(22) Filed: Feb. 24, 2011

(65) Prior Publication Data
US 2012/0218906 A1    Aug. 30, 2012

(51) Int. Cl.
| H04L 1/00 | (2006.01) |
| H04L 1/18 | (2006.01) |
| H04L 12/835 | (2013.01) |
| H04L 12/811 | (2013.01) |
| H04L 12/801 | (2013.01) |

(52) U.S. Cl.
CPC ............ H04L 1/007 (2013.01); H04L 1/0017 (2013.01); H04L 1/0072 (2013.01); H04L 1/1861 (2013.01); H04L 47/30 (2013.01); H04L 47/38 (2013.01); H04L 1/0002 (2013.01); H04L 1/0009 (2013.01); H04L 47/29 (2013.01)

(58) Field of Classification Search
None
See application file for complete search history.

(56) References Cited

U.S. PATENT DOCUMENTS

| 7,675,988 | B2 * | 3/2010 | Kim .................... H04B 7/0617 375/267 |
| 7,792,035 | B2 * | 9/2010 | Kim et al. ................... 370/235 |
| 8,306,541 | B2 * | 11/2012 | Laroia et al. ................ 455/450 |
| 8,379,600 | B2 * | 2/2013 | Kim et al. ................... 370/332 |
| 2008/0039145 | A1 * | 2/2008 | Ishii .................... H04B 1/1027 455/561 |

OTHER PUBLICATIONS

Holma, H., et al., "WCDMA for UMTS for Radio Access for Third Generation Mobile Communications", 2000, Wiley, pp. 12-13, and pp. 231-232.
Malkamaki, E., et al., "Performance of Hybrid ARQ Techniques for WCDMA High Data Rates", © 2001 IEEE, pp. 2720-2724.
Yu, Y., et al., "The Effect of Hybrid ARQ Schemes on the TCP Connection over Wireless Link", © 2007 IEEE, pp. 4169-4174.

(Continued)

*Primary Examiner* — Rhonda Murphy
(74) *Attorney, Agent, or Firm* — Oblon, McClelland, Maier & Neustadt, L.L.P.

(57) ABSTRACT

In accordance with an example embodiment of the present invention, there is provided a method, including receiving data for transmission over a physical link, acquiring information about the data transmission, setting physical layer link adaptation parameters for the transmission based on the acquired information, wherein the setting includes adjusting the physical layer link adaptation parameters separately for transmission in an application data transfer direction and an application feedback direction. Also, the present invention provides a correspondingly adapted device and computer program product.

19 Claims, 6 Drawing Sheets

(56) References Cited

OTHER PUBLICATIONS

3GPP TS 25.215 V9.2.0 (Mar. 2010), "3$^{rd}$ Generation Partnership Project; Technical Specification Group Radio Access Network; Physical layer; Measurements (FDD) (Release 9)", 23 pgs.
3GPP TS 36.213 V10.0.1 (Dec. 2012), "3$^{rd}$ Generation Partnership Project; Technical Specification Group Radio Access Network; Evolved Universal Terrestrial Radio Access (E-UTRA); Physical layer procedures (Release 10)", 98 pgs.
3GPP TS 36.214 V10.0.0 (Dec. 2012), "3$^{rd}$ Generation Partnership Project; Technical Specification Group Radio Access Network; Evolved Universal Terrestrial Radio Access (E-UTRA); Physical layer; Measurements (Release 10)",13 pgs.
3GPP TS 25.101 V10.0.1 (Jan. 2011), "3$^{rd}$ Generation Partnership Project; Technical Specification Group Radio Access Network; User Equipment (UE) radio transmission and reception (FDD) (Release 10)", 265 pgs.

* cited by examiner

METHOD AND APPARATUS FOR PHYSICAL LAYER LINK ADAPTATION BASED ON TRAFFIC PROPERTIES

TECHNICAL FIELD

The present application relates generally to physical layer link adaptation based on traffic properties.

BACKGROUND

Mobile data transmission and data services are constantly making progress. With the increasing penetration of such services, also the transmitted data volume is continuously increasing. Given the constraints of limited bandwidth for transmission, data throughput is an important aspect for users as well as network operators.

Generally, data transmission is based on the OSI layer model (OSI=Open Systems Interconnection). The highest layer (layer 7) is referred to as application layer, while the lowest layer (layer 1) is referred to as physical layer. According to OSI principles, data transmission on the application layer is independent of the physical layer actually used. The physical layer, in turn, is strongly dependent on the actual medium or channel (bearer) used. Thus, wire based transmission strongly differs from wireless transmission. However, having regard to wireless transmission, the physical layer also depends on the type of transmission medium used, i.e. infrared transmission, radio transmission, or others. Also, various different transmission protocols exist for transmission on respective OSI layers, and the transmission protocols used may depend on the data traffic to be carried.

Generally, wireless transmission in the framework of mobile data transmission or mobile communication services nowadays implies radio transmission via the so-called air interface. For this reason, also the present invention is described using radio transmission via the air interface as an example. However, the principles set out in the present application are generally also applicable to other physical channels.

Mobile communication has evolved in the past years from GSM (Global System of Mobile Communication) via UMTS/3GPP (Universal System for Mobile Communication/$3^{rd}$ Generation Partnership Project) up to LTE (Long Term Evolution) nowadays under discussion.

In those systems, nowadays packet switched data traffic is widely used. In packet based traffic, it is to a certain extent acceptable that some packets are lost or erroneously transmitted in transmission as the lost/erroneous data content can be ignored, can be reconstructed from other packets, or, according to at least some protocols used, can be requested to be retransmitted. The loss/erroneous rate of data packets is referred to herein as packet error rate.

For example, 3GPP WCDMA HSPA (Wideband Code Divisional Multiple Access, High Speed Packet Access) and LTE systems use a mechanism of physical layer link adaptation.

Generally, link adaptation adapts a selection of modulation schemes and channel coding schemes to the currently prevailing channel conditions. This determines the data rate and/or the error probability of the link for which link adaptation is performed. Such mechanism adapts the data transmission on the physical layer (layer 1, L1) to the prevailing radio channel conditions. Typical studies of Layer 1 show that an optimum L1 capacity (also referred to as data throughput) is achieved by tuning the L1 packet error rate of the initial or first transmission to a packet error rate level of 10%. This means that there is a 10% probability that a packet is erroneously transmitted or lost. Notwithstanding such typical working assumption, it is generally of course also possible that for such initial/first transmission a packet error rate is set within the range of 5% to 30%. A typical assumption in such transmission scenario is that a transmission buffer of a transmitting device is full of data. This means that Layer 1 packets can be as large as possible and interleaving gain in time or frequency domain can be utilized together with HARQ (Hybrid Automatic Repeat Request) to reduce the error level significantly. However, if the Layer 1 packets are small (in size and/or number), it is difficult to use link adaptation and HARQ efficiently as the physical layer link adaptation and HARQ is designed for large packets.

Considering for example TCP protocol (Transmission Control Protocol) used in FTP file downloading (File Transfer Protocol) or WWW (World Wide Web) page viewing, the protocols have an impact on the buffer fill level seen at the 3GPP RLC/MAC layer or physical layer. (Note that RLC/MAC, i.e. Radio Link Control/Medium Access Control, and physical layer are tightly interconnected. Although 3GPP specifications specify link adaptation as a MAC layer functionality, for the purposes of the present application RLC/MAC and the physical layer are jointly considered to simplify the description)

In general, the offered load by the TCP traffic is scaled by TCP parameters such as round trip time and transmission window size. Considering for example FTP file downloading from network (NW) to a terminal such as an user equipment UE, this generates a relatively large amount of traffic into the downlink direction from the network, i.e. from a Node_B (according to UMTS) as a transmitter to the terminal/user equipment UE as a receiver. The direction of the data transfer in this scenario is the downlink direction. However, a small amount of traffic is also generated in reverse direction, i.e. in uplink direction. Such uplink traffic consists of for example TCP ACK packets (acknowledgement) and possible internal RRC (Radio Resource Control) control packets. Note that losing of the TCP control feedback packets is not desired because it causes retransmissions and time outs into the TCP connection.

It has been assumed earlier in some studies that CQI link adaptation should operate on the relatively high packet error rate target in order to gain from HARQ retransmissions.

Different traffic related 3GPP test configurations have been specified in other studies for WCDMA DPCH channel (Dedicated Physical Channel). It was generally assumed that 12.2 kbps AMR speech (Adaptive Multi Rate) would use 1% transport block error rate target (for a conversational QoS) and packet data service could be run at 10% physical layer transport block error rate. Data integrity would be covered by RLC (Radio Link Control) Acknowledged mode (AM). The error rate adaptation on the DPCH was made using fast power control and no CQI link adaptation or HARQ was used. Different radio bearer classes and QoS is discussed in some other documents. TCP protocol performance with ARQ (Automatic Repeat Request) was studied in still other documents.

However, there is still a need to further improve data transmission performance.

SUMMARY

Various aspects of examples of the invention are set out in the claims.

According to a first aspect of the present invention there is provided a method, comprising: receiving data for transmission over a physical link, acquiring information about the data transmission, setting physical layer link adaptation parameters for the transmission based on the acquired information, wherein the setting comprises adjusting the physical layer link adaptation parameters separately for transmission in an application data transfer direction and an application feedback direction.

According to exemplary further developments of the method, the acquiring comprises extracting information on at least a quality of service defined for the transmission and a direction of the transmission;

the acquiring comprises calculating a fill level of at least one buffer temporarily storing data, deciding on physical link layer adaptation parameter of the transmission based on comparing the fill level with at least one threshold value;

the calculating comprises measuring a fill level of the buffer and filtering a currently measured fill level;

the filtering comprises using an infinite impulse response filter configured to smooth buffer fill level variations;

the deciding comprises comparing the fill level with two different threshold values configured to provide for hysteresis;

the adjusting comprises modifying at least one of a modulation scheme and a coding scheme used for data transmission on the physical link layer such that the resulting error rate probability for transmission in the application feedback direction is lower than the error rate probability for transmission in the application data transfer direction;

the error rate probability for transmission in the application data transfer direction is selected to obtain maximum capacity and the error rate probability for transmission in the application feedback direction is selected to obtain optimum reliability;

the error rate probability for transmission in the application data transfer direction is set in a range from 5% to 30% and the error rate probability for transmission in the application feedback direction is set in a range from 0% to 5%;

the modulation scheme used for data transmission in the application feedback direction is limited to a low order modulation;

the coding scheme used for data transmission in the application feedback transmission adopts one of a low data rate CQI, a CQI backoff scheme, a CQI fixed to 1/3 QPSK, and a CQI fixed to 1/10 QPSK.

According to a second aspect of the present invention, there is provided a device, comprising: a receiver module configured to receive data for transmission over a physical link, an acquisition module configured to acquire information about the data transmission, a control module configured to set physical layer link adaptation parameters for the transmission based on the acquired information, wherein the control module is configured to adjust the physical layer link adaptation parameters separately for transmission in an application data transfer direction and an application feedback direction.

According to exemplary further developments of the device, the acquisition module is configured to extract information on at least a quality of service defined for the transmission and a direction of the transmission;

the acquisition module is configured to calculate a fill level of at least one buffer temporarily storing data, and to decide on a physical link layer adaptation parameter of the transmission based on comparing the fill level with at least one threshold value;

the acquisition module is configured to measure a fill level of the buffer and to filter a currently measured fill level;

the acquisition module is configured as an infinite impulse response filter configured to smooth buffer fill level variations;

the acquisition module is configured to decide by comparing the fill level with two different threshold values configured to provide for hysteresis;

the control module is configured to adjust by modifying at least one of a modulation scheme and a coding scheme used for data transmission on the physical link layer such that the resulting error rate probability for transmission in the application feedback direction is lower than the error rate probability for transmission in the application data transfer direction;

the control module is configured to select the error rate probability for transmission in the application data transfer direction to obtain maximum capacity and to select the error rate probability for transmission in the application feedback direction to obtain optimum reliability;

the error rate probability for transmission in the application data transfer direction is set in a range from 5 to 30% and the error rate probability for transmission in the application feedback direction is set in a range from 0% to 5%;

the modulation scheme used for data transmission in the application feedback direction is limited to a low order (e.g. QPSK) modulation.

the coding scheme used for data transmission in the application feedback transmission adopts one of a low data rate CQI, a CQI backoff scheme, a CQI fixed to 1/3 QPSK, and a CQI fixed to 1/10 QPSK.

According to a third aspect of the present invention, there is provided a computer program product comprising computer-executable components which, when the program is run on a computer, are configured to receive data for transmission over a physical link, acquire information about the data transmission, set physical layer link adaptation parameters for the transmission based on the acquired information, wherein the setting comprises adjusting the physical layer link adaptation parameters separately for transmission in an application data transfer direction and an application feedback direction.

The above computer program product may further comprise computer-executable components which, when the program is run on a computer, perform the method aspects mentioned above in connection with the first aspect.

The above computer program product/products may be embodied as a computer-readable storage medium.

Thus, as becomes apparent from the above, according to at least one or more exemplary embodiments of the invention, the nature of the traffic or quality of service (QoS) class is considered, i.e. whether the traffic has a feedback channel or not and whether there is traffic asymmetry between the application data transfer direction and an application feedback direction.

Moreover, the traffic in both directions (such as uplink and downlink traffic) is considered as a complete package. Not only is the application data transfer direction considered but in addition also the related application level feedback direction.

It becomes evident that there is an impact from physical layer on an application feedback point of view to the entire application layer performance as in exemplary embodiments, the link adaptation differs between data transfer direction and feedback direction.

According to exemplary embodiments of the invention, an overall interaction between downlink and uplink is now taken into account in order to improve application layer performance. Thus, a cross-layer improvement can be realized, as a modification on the physical layer as done in exemplary embodiments of the invention improves the application layer performance. Stated in other words, even though the reliability, not the capacity of the feedback channel is maximized, overall capacity of the system increases in the application layer point of view. Thus, the invention at least in exemplary embodiments, improves end-to-end throughput and application level performance

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
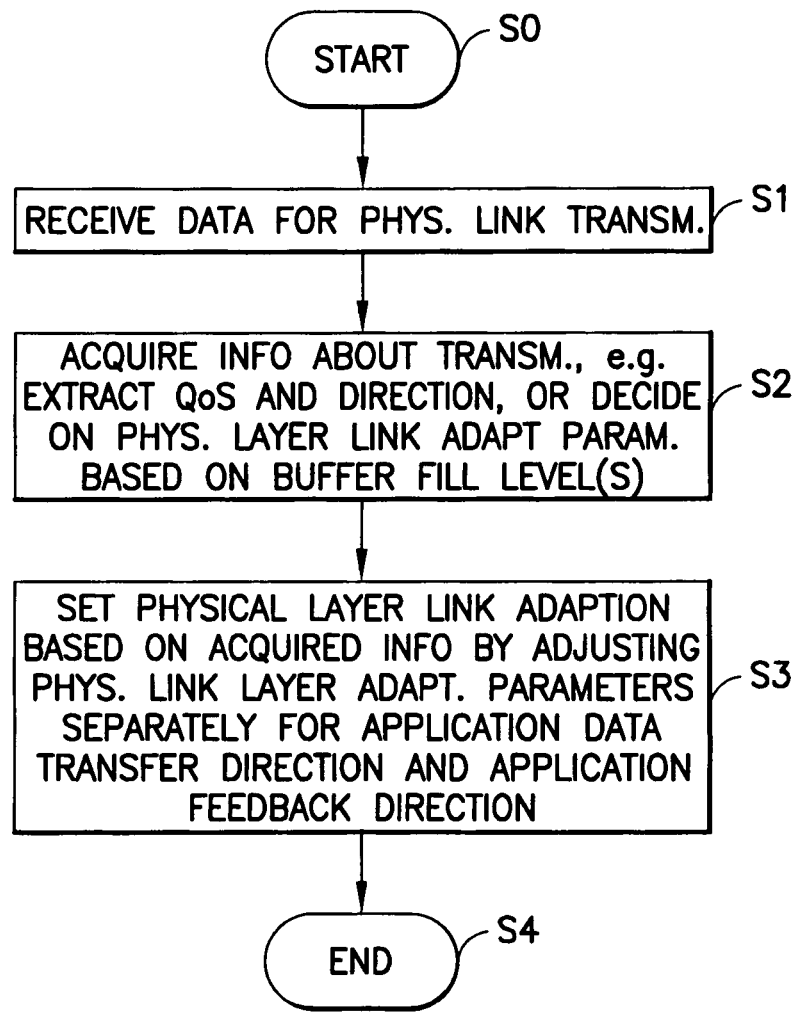
FIG. 1 shows a basic flowchart of method aspects in relation to the invention.

Exemplary aspects of the invention will be described herein below.

Generally, according to at least some of the exemplary aspects and embodiments of the invention, it is proposed to acquire the information on the type of the transmission and nature of the traffic (presence of a feedback channel and asymmetry between uplink and downlink, for example) both in uplink and downlink and then set the physical layer link adaptation targets optimally both in uplink and downlink in order to ensure high application throughput. (This is in contrast to prior art, which typically covers only configuring the physical layer setup in the application data transfer direction. The application level feedback direction is not considered for physical layer adaptations.) Acquisition of information on the traffic can exemplarily be based on extraction of information on QoS from protocol messages, or also exemplarily be based on buffer fill level evaluation on which a decision on physical link layer adaptation parameters is based.

In the following description, it is mainly considered TCP protocol based traffic, which is described by a relatively heavy traffic load in one direction (e.g. downlink as the application data transfer direction in case of a download scenario) and a small control traffic load on reverse direction (e.g. uplink in such scenario).

Other protocols, however, which have insofar similar properties like the TCP protocol can also benefit from the invention when it is applied to those protocols. For example, a stream control transfer protocol, SCTP, is named here as a further example protocol to which the present invention is applicable.

According to an aspect of exemplary embodiments of the invention, information on the traffic type and direction is acquired/estimated for data received for transmission over a physical link.

For example, this acquiring can exemplarily be accomplished in the following manners and/or by correspondingly configured modules at a transmitter/receiver side.

Acquiring can exemplarily be accomplished by a) using network set information on the QoS. For example, it may be signaled (in data received for transmission) that file download is used. If signaled parameters are used, link adaptation also knows the direction of the traffic. Such information may be extracted from messages such as the messages for radio bearer setup (E-RAB). The bearer may have QCI (Qos class identifier) which may be utilized to identify traffic type. In addition the E-RAB-SETUP-REQUEST may contain information specifically for data rates in uplink and downlink directions, e.g. "GBR QoS Information" maximum and guaranteed bitrate both for uplink and downlink and/or "UE Aggregate Maximum Bit Rate" for non-GBR traffic both in uplink and downlink.

b) alternatively, by evaluating, i.e. measuring and/or filtering RLC/MAC buffer level of one or more data buffers. One can smooth the buffer level variations by for example an infinite impulse response filter, IIR filter.

An exemplary filter function may be $$aveBFlevel = (1-alpha)*aveBFlevel + alpha*BFstatus,$$

where:
aveBFlevel=average filtered buffer level,
alpha=filtering parameter
BFstatus=Transmission Buffer status according to latest (preceding) observation
Or, stated in another notation for the IIR filter $$output(n) = (1-alpha)*input(n) + alpha*output(n-1)$$

Where the alpha is in both cases the filtering constant and typically in the range of]0 1].

Measuring the filtered buffer status level is beneficial since one does not need any extra information from other layers. Simple thresholding (using a single threshold only) can be used to decide on the traffic rate and thereby whether to use link adaptation parameters of high rate traffic or low rate traffic.

Figure 5:
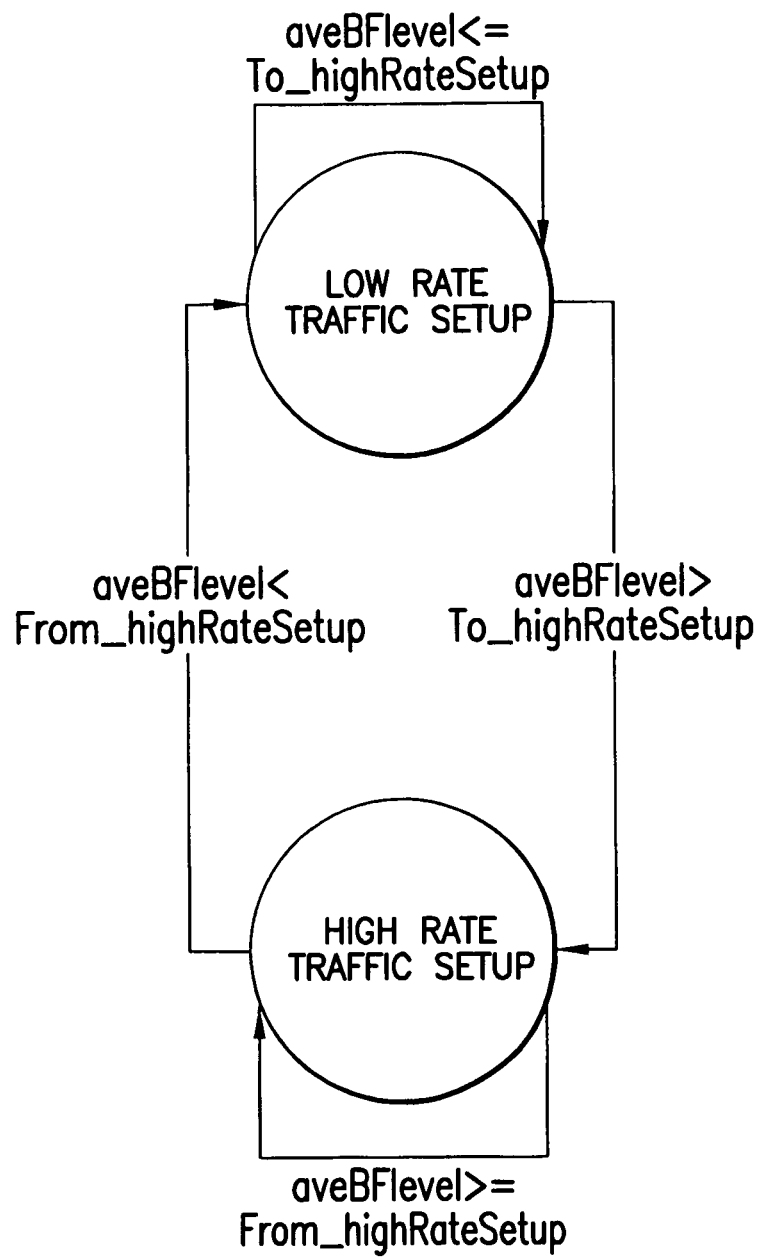
FIG. 5 shows an exemplary state diagram of a state machine for switching between link adaptation parameter setup for high rate and low rate traffic.

Alternatively, a state machine can be used to decide between high rate traffic or low rate traffic parameter setup, as in FIG. 5. Hysteresis can be built by setting different filtered buffer levels as threshold values into the state transition conditions. This will also prevent ping-ponging between the states. The use of filtered buffer levels may have an additional advantage that it can easily support multiple different flows simultaneously, possibly with different priorities, as from a physical layer viewpoint, the combined traffic is decisive.

According to a further aspect of exemplary embodiments of the invention, setting of physical layer link adaptation parameters based on the acquired information is accomplished in that physical layer link adaptation parameters are adjusted separately for the different traffic directions (application data transfer and application feedback directions) carrying an asymmetric traffic load.

For example, this adjusting can exemplarily be accomplished in the following manners and/or by correspondingly configured modules at a transmitter/receiver side.

Adjusting can exemplarily be accomplished by adjusting the physical link adaptation setup such that:
a) High rate traffic (generally in the application data transfer direction) will:
   a. Use link adaptation to select the modulation and coding rate with the full scale and run the error rate target into approximately 10% region or more generally e.g. between 5% and 30% in order to utilize HARQ retransmissions
b) Low rate traffic (generally in the application feedback direction) will:
   a. Use the link adaptation set at a region where physical layer packet error rate is low, e.g. 1%, or more generally e.g. between 0% and 5% (in case of 10% for the application data transfer direction, or even higher than 5% in case the high rate traffic in the application data transfer direction is higher than the above mentioned approximately 10% region, e.g. above 15%) in order to reduce use of HARQ retransmissions.

There are several ways to reduce the low rate traffic error level or error rate compared to the typically assumed 10% packet error rate target assumed in the CQI reporting. For example:
a. set a CQI backoff value to reduce the reported CQI report and use that in link adaptation
b. limit the use of high order modulations such as 16 or 64 QAM and use QPSK modulation only
c. set the CQI fixed to for example QPSK ⅓-rate or to ⅒ rate (as in FIG. 6)
d. select a low rate CQI based on for example measured path loss, CPICH Ec/No in WCDMA or Reference Signal Received Quality (RSRQ) in LTE (users closer to base station/Node_B can be allocated a marginally higher CQI).

The low order/low rate CQI refers to a low data rate CQI e.g. QPSK modulated ⅓-rate coding or ⅒ rate coding, or the like. CQI backoff means that the NodeB could reduce the UE reported value by some number. For example, UE reports CQI number 10 to match 10% target level and eNodeB decides to use CQI 5 only.

The use of low order CQI increases the use of physical layer resources and increases interleaving gain, thus creating additional robustness. The increased resource usage does not matter since the offered traffic is low rate.

Exemplary embodiments of the present invention and potential advantages are understood by referring to FIGS. 1 through 6 of the drawings.

FIG. 1 shows a basic flow chart of method aspects in relation to the invention. The method starts in a step S0.

Thereafter, in a step S1, the transmitter receives data for transmission over the physical link. The transmitter may be a Node_B according to UMTS, an access point in a WLAN/WiMAX scenario or a user equipment. In case of a base station/Node_B or access point, data is transmitted in downlink DL towards a user equipment UE, while in case the transmitter is a user equipment, data is transmitted in uplink UL direction. Data transmission as used herein refers to the application data transfer direction. Depending on the protocol used for the application data transfer, in addition to the application data transfer direction, also an application feedback direction exists. For example, with reference to TCP as an exemplary example of a protocol used, the TCP feedback control signals are transmitted in application feedback direction while the actual payload carried using TCP protocol is transferred in the application data transfer direction.

In step S2, information about the transmission is acquired. For example, quality of service of the transmission as well as direction of the transmission can be extracted from the data to be transmitted, e.g. from certain protocol messages. Alternatively, such information can be acquired in that a decision on physical layer link adaptation parameters is taken based on evaluating buffer fill level or levels. Namely, what is acquired as "quality of service QoS" or transmission information, among others, is traffic asymmetry between uplink and downlink, or application data transfer direction and application feedback direction, respectively, and the presence of a feedback channel for the application data traffic, if any. For example, the presence of a feedback channel can be identified if the TCP protocol is used (based on e.g. TCP header detection). Likewise, this applies in case of SCTP protocol being used. These properties are also referred to in some places as type of transmission or nature of traffic in the present application.

If information on the quality of service is acquired based on the received data for transmission, this can be acquired by looking at the radio bearer setup. For example, in some instances, technical specifications for mobile communication specify messages for the radio bearer setup such as E-RAB. The bearer may have a QoS class identifier QCI which may be utilized to identify the traffic type/nature. Additionally, a E-RAB-setup-request may contain information specifically for data rates in uplink and downlink directions such as "GBR QoS information" maximum and guaranteed bitrate, both for uplink and downlink, or "UE aggregate maximum bitrate" for non-GBR traffic both in uplink and downlink.

Subsequently, in a step S3, the physical layer link adaptation is set or configured based on the acquired information. This is accomplished by adjusting the physical link layer adaptation parameters separately for the application data transfer direction and the application feedback direction.

In particular, such adjusting may comprise modifying at least one of a modulation scheme and a coding scheme used for data transmission on the physical link layer such that the resulting error rate probability for transmission in the application feedback direction is lower than the error rate probability for transmission in the application data transfer direction. In particular, the error rate probability for transmission in the application data transfer direction is selected (or "tuned") to obtain a maximum capacity while the error rate probability for transmission the application feedback direction is selected (or "tuned") to obtain optimum reliability.

In an exemplary embodiment of the present invention described herein below, the error rate probability for transmission in the application data transfer direction is 10%. If so, the error rate probability for transmission in the application feedback direction is advantageous if set in a range from for example 0% to 5%. However, the percentages for the error rate probability in application feedback direction may vary if the error rate probability for transmission in the application data transfer direction differs from the indicated 10%. For example, the error rate probability for transmission in the application feedback direction can even be higher than 5% in case the error rate probability in the application data transfer direction is higher than the above mentioned approximately 10% region, e.g. above 15%. Thus, depending on the actual environment, the percentage values may differ. However, the skilled reader will understand how to adjust error rate probability for transmission in application data transfer direction to obtain maximum capacity while tuning error rate probability for transmission in the application feedback direction to obtain optimum reliability.

For example, reducing the error rate probability for transmission in the application feedback direction can be accomplished by limiting the modulation scheme used to a low order modulation, such as QPSK modulation (Quadrature Phase Shift Keying). A coding scheme used for data transmission in the application feedback transmission for reducing the error rate probability can be one of a low data rate CQI, can be based on a CQI backoff scheme, be a CQI fixed to ⅓ QPSK and a CQI fixed to ¹⁄₁₀ QPSK. Although exemplary embodiments of the present invention may use ⅓ QPSK and ¹⁄₁₀ QPSK data rate, depending on the actual environment concerned, also fractions between ⅓ and ¹⁄₁₀ may be applicable.

Subsequently, the method proceeds to a step S4 where the method comes to an end and transmission proceeds based on the physical link layer adapted as described above.

Figure 2:
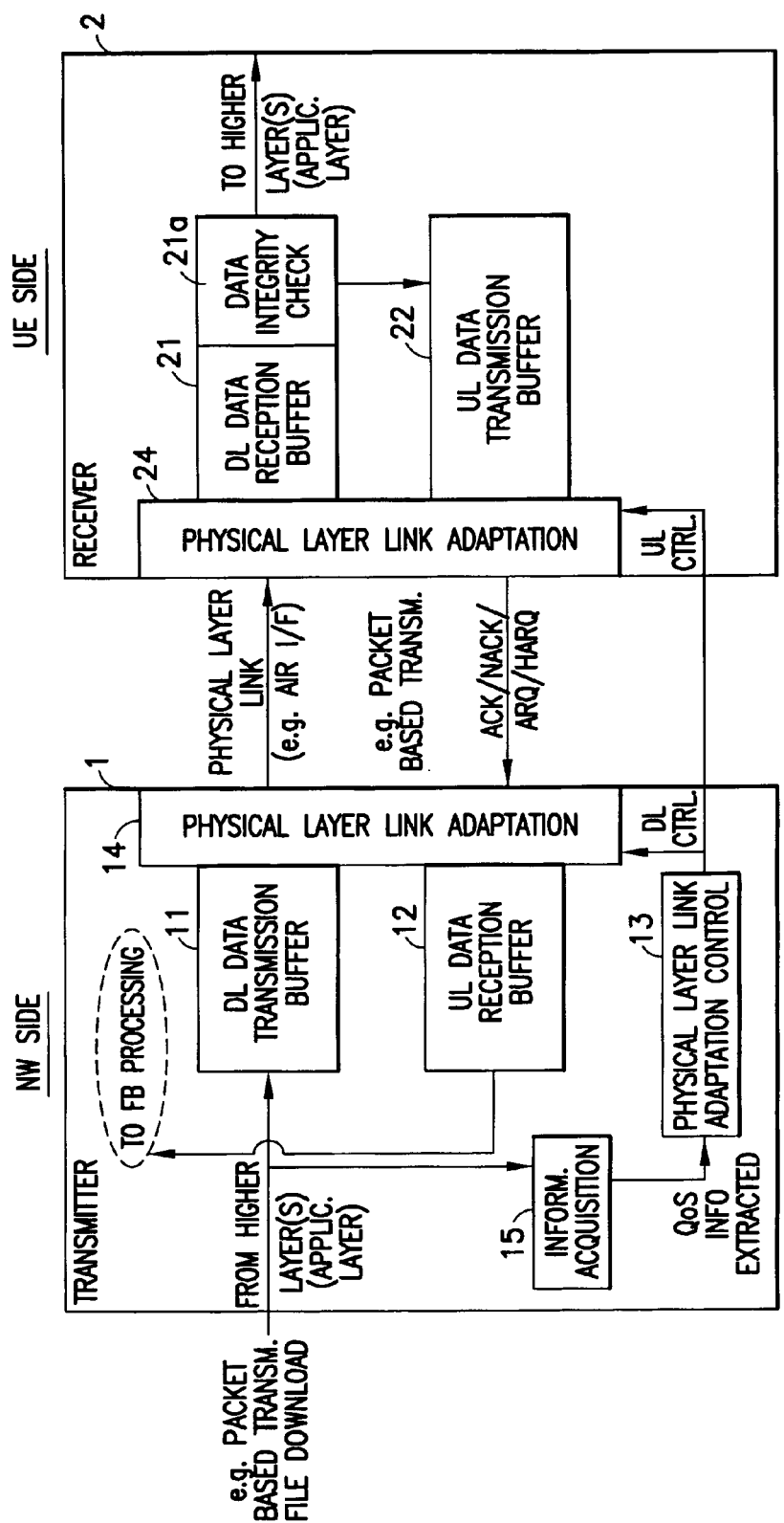
FIGS. 2, 3 and 4 show basic block circuit diagrams of exemplary embodiments of the invention.

FIG. 2 shows a basic block circuit diagram of a first exemplary embodiment of the invention.

Without restricting the description, it is still assumed that the data transmission is based on TCP protocol based traffic from the network NW side to a user equipment UE side. (Note that also SCTP may be used in other scenarios.) In such a scenario, the network side is represented by the transmitter such as a Node_B or access point, and the user equipment side is represented by a receiver such as a user equipment or smart phone or any other terminal adapted to communicate in such a network scenario. In case of a WLAN environment, the transmitter can be an access point at the network side and the receiver on the terminal side can be a user equipment or smart phone or a personal computer or netbook or the like.

The transmitter 1 receives for example packet based transmission file download data from higher layers such as the application layer. Note that elements or modules of the transmitter as well as receiver are only schematically depicted and only those are depicted that are in relation to the present invention and that need to be explained to understand the present invention. The packet based data from the higher layers are supplied to a downlink data transmission buffer 11. The downlink data transmission buffer is connected to a physical layer link adaptation module 14. Data are transmitted from the downlink data transmission buffer 11 via the physical layer link adaptation over a physical layer link such as the air interface to the receiver 2 on the user equipment side or terminal side. Likewise, the receiver 2 is equipped with a physical layer link adaptation module 24 connected to a downlink data reception buffer 21. The received data are subjected to a data integrity check conducted in a data integrity check element 21a. The data integrity check element 21a delivers the integrity check result to an uplink date transmission buffer 22 also connected to the physical layer link adaptation module 24. With reference to the exemplary embodiment referring to the TCP protocol based traffic, for uplink data transmission from the terminal side as a receiver to the network side, acknowledgement or negative acknowledgement ACK/NACK or automatic repeat requests ARQ or hybrid automatic repeat requests HARQ are delivered in an application feedback direction, in this scenario uplink, to the transmitter. They are received in an uplink data reception buffer 12 at the transmitter side and from there supplied to a feedback processing (not shown). Data received at the receiver 2 in the downlink data reception buffer 21 are subsequently forwarded at the receiver side to a higher layer application on the application layer. According to this exemplary embodiment, the transmitter, here on the network side, is equipped with an acquisition module 15 configured to acquire information about the data transmission. In this exemplary embodiment, the acquisition module 15 is configured to extract information on at least a quality of service QoS defined for the transmission and the direction of the transmission. This acquisition is based on e.g. certain protocol messages within the packed based transmission file download data received from the higher layer applications. In FIG. 2, this is illustrated by the module "15" and signal branch which is branched from the data supplied to the downlink data transmission buffer 11. The acquired/extracted QoS information is supplied to a control module 13, i.e. the physical layer link adaptation control element 13 which is configured to adjust the physical layer link adaptation parameters separately for transmission in an application data transfer direction and an application feedback direction. In the illustrated scenario, the application data transfer direction is the downlink DL direction from network side to user equipment side, and the application feedback direction is the uplink UL direction from user equipment side as the receiver to the network side transmitter.

The physical layer link adaptation control element 13 constituting at least part of the control module is configured to adjust by modifying at least one of a modulation scheme and a coding scheme used for data transmission on the physical link layer such that the resulting error rate probability for transmission in the application feedback direction is lower than the error rate probability for transmission in the application data transfer direction. That is, the control module is configured to select (or "tune") the error rate probability for transmission in the application data transfer direction to obtain maximum capacity and to select (or "tune") the error rate probability for transmission in the application feedback direction to obtain optimum reliability. In this regard, the same exemplary examples as given with respect to the description of FIG. 1 illustrating method aspects are applicable. That is, in a scenario in which the error rate probability for transmission in the application data transfer direction is about 10%, the error rate probability for transmission in the application feedback direction is set in a range from about 0% to 5%. Also, in such scenario, the modulation scheme used for data transmission in the application feedback direction is limited in the exemplary embodiment to a low order modulation, such as QPSK modulation (Quadrature Amplitude Modulation QAM is not used in the application feedback direction). Also, as explained with reference to the method aspects, a coding scheme used for data transmission in the application feedback transmission adopts one of a low data rate CQI, a CQI backoff scheme, a CQI fixed to ⅓ QPSK and a CQI fixed to ¹⁄₁₀ QPSK. Of course, fractions between ⅓ and ¹⁄₁₀ QPSK are also applicable in other exemplary embodiments of the present invention.

The physical layer link adaptation control element 13 informs the modified or selected modulation scheme and coding scheme for data transmission on the physical link layer to the physical link layer adaptation module 14 for downlink transmission (application data transfer direction in this embodiment) and to the physical layer link adaptation module 24 on the receiver side for application feedback direction (uplink in the present embodiment).

Figure 3:
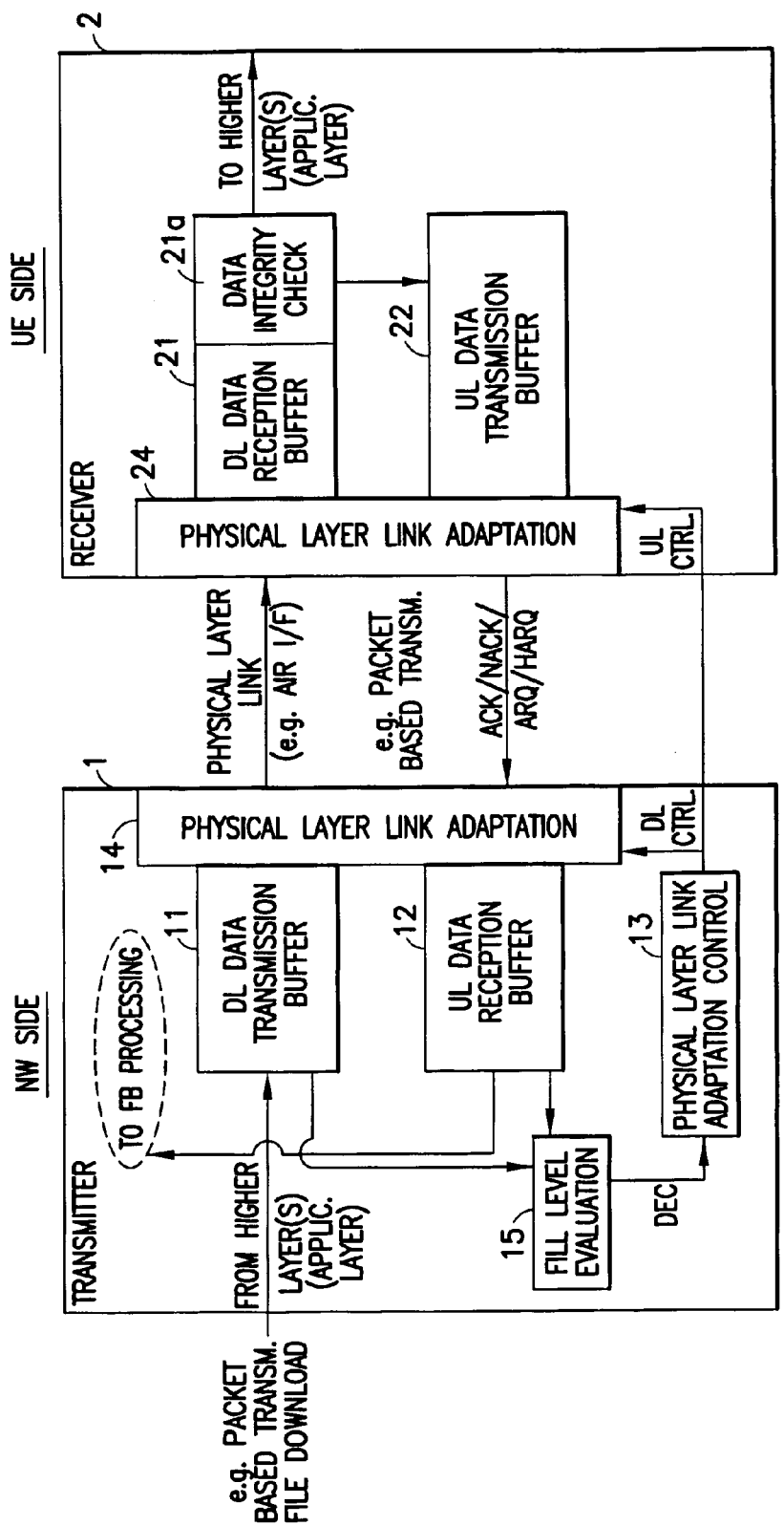

FIG. 3 shows another basic block circuit diagram of another exemplary embodiment of the invention. FIG. 3 is in many parts identical to FIG. 2. This is derivable already from the fact that same parts and modules are assigned identical reference numerals. A difference resides merely in how information about the data transmission is acquired and insofar concerns the acquisition module which is configured to acquire such information about the data transmission. Therefore, only those differing parts will be explained hereinafter.

Namely, instead of extracting information on at least a quality of service defined for the transmission and the direction of the transmission based on the packet based transmission data received from a higher layer or the application layer supplied to the downlink data transmission buffer, in this exemplary embodiment at least, the acquiring comprises calculating a fill level of at least one buffer temporarily storing data and deciding on a quality of service of the transmission by comparing the fill level with at least one threshold value. That is, a fill level evaluation module 15 is provided on the transmitter side in this exemplary embodiment. This fill level evaluation module 15 obtains information on the fill level of the downlink data transmission buffer 11 as well as on the fill level of the uplink data reception buffer 12. The uplink data reception buffer 12 receives acknowledgement ACK or negative acknowledgements NACK or retransmission requests ARQ/HARQ from the receiver side. By detecting the presence of such data in the uplink data reception buffer 12, the acquisition module 15 is configured to find out if the traffic has a feedback channel at all (for example, it is identified that TCP or SCTP protocol is used). Furthermore, by detecting differences in the downlink data transmission buffer 11 fill level and the uplink data reception buffer 12 fill level, traffic asymmetry between uplink and downlink can be evaluated/detected. Insofar, the type of transmission and the nature of traffic can be acquired. The acquisition module 15/fill level evaluation module 15 is configured to calculate the fill level of at least one buffer temporarily storing such data and to decide on physical layer link adaptation parameters for the transmission by comparing the fill level with at least one threshold value. Optionally, the acquisition module/fill level evaluation module 15 is configured to measure a fill level of the buffer or buffers and to filter a respective measured fill level. For example, an infinite impulse response filter may be used for filtering purposes so as to smooth buffer fill level variations. Furthermore, a fill level of a respective buffer can be compared by a correspondingly configured acquisition module with two different threshold values per buffer so as to be configured to provide for hysteresis and to avoid ping-ponging in the resulting evaluation result.

The evaluation result is output from the fill level evaluation module 15/acquisition module as a signal "decision" labeled "DEC" that is supplied to the physical layer link adaptation control module 13 (also referred to as control module). Based on the DEC input signal, the physical layer link adaptation control 13 then works as described hereinbefore with reference to FIG. 2.

In this exemplary embodiment at least, the entire acquisition and control is located at the transmitter side. Namely, based on the acquisition/fill level evaluations, physical layer link adaptation control is effected by the transmitter for application data transfer direction (downlink in this scenario) as well as for the application feedback direction (uplink in this scenario). The control information for the uplink control is in this example also supplied via the air interface to the receiver so as to take effect on the physical layer link adaptation module 24 at the receiver side for uplink transmission.

Likewise, as explained with reference to FIG. 2 already, in case of an upload of a packet based transmission file from a terminal such as a user equipment or smart phone towards the network side, the roles of NW side transmitter and UE side receiver are reversed and correspondingly, the downlink/uplink directions or application data transfer direction and application feedback direction, respectively, are reversed. Such modification is of course also conceivable but not illustrated here in detail as it is believed to be understood without separate illustration.

Figure 4:
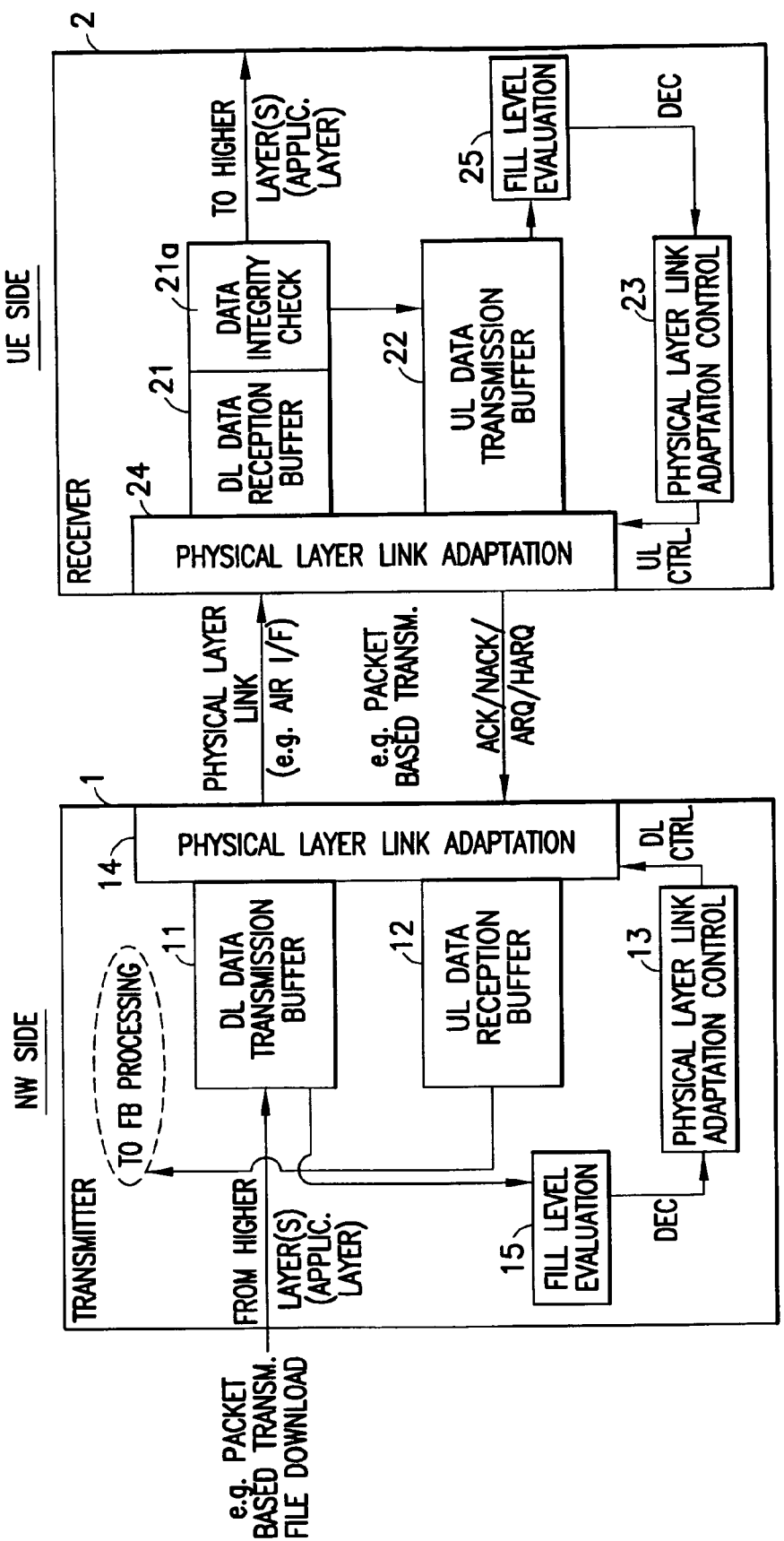

FIG. 4 is a further basic block circuit diagram of still another exemplary embodiment of the invention. FIG. 4 is again largely identical to FIG. 3 except that the acquisition and control is now distributed between transmitter and receiver. The same modules and functionalities are denoted with the identical reference numerals as in FIGS. 2 and 3 and a repeated description thereof is omitted. Only the differences will hereinafter be explained in greater detail.

Like in FIG. 3, the transmitter in FIG. 4 is equipped with a fill level evaluation module 15/acquisition module. However, in this exemplary embodiment illustrated in FIG. 4, the fill level evaluation module 15 is connected only to the downlink data transmission buffer to evaluate the fill level of the downlink data transmission buffer 11. Based on the downlink data transmission buffer 11 fill level, an evaluation on the downlink data transmission, in this instance in the application data transfer direction, is taken and supplied as an evaluation signal labeled DEC to the physical layer link adaptation control module/control module 13. The control module 13 then supplies a corresponding downlink control signal to the physical layer link adaptation module 14 in the application data transfer direction, i.e. in the downlink direction in this instance. On the receiver side however, also a fill level evaluation module 25 is provided. This fill level evaluation module/acquisition module 25 evaluates the fill level of the uplink data transmission buffer 22 to which it is connected. This uplink data transmission buffer 22 receives the data integrity check results and intermediately stores acknowledgement ACK, negative acknowledgement NACK or retransmission requests ARQ/HARQ. Thus, in this uplink data transmission buffer 22, the data transmitted in the application feedback direction are stored. Hence, by evaluating the fill level of this uplink data transmission buffer (which corresponds to the uplink data reception buffer 12 at the transmitter side), it can be found out whether the traffic has a feedback channel. Based on the receiver side fill level evaluation of the uplink data transmission buffer 22, a DEC signal is output as an input to the physical layer link adaptation control 23 located at the receiver side. This control module 23 in turn outputs a control signal for the application feedback direction, i.e. uplink control signal supplied to the physical layer link adaptation module 24 at the receiver side. In this distributed architecture, it becomes dispensable to transmit a control signal for uplink control via the physical layer, as it was the case in the scenario illustrated in FIG. 3.

FIG. 5 shows a state diagram of a state machine for switching between link adaptation parameter setup for high rate and low rate traffic, respectively, that is exemplarily representing for example a fill level evaluation module 15 and/or 25. Two states are illustrated, a low rate traffic setup state as well as a high rate traffic setup state. "Setup" in this regard refers to the link adaptation parameter configuration and/or adjustment in which at least one of a modulation scheme and a coding scheme used for data transmission on the physical link layer are modified in the above-described manner or manners. A transition between respective states is indicated by arrows, and also a resting in a respective state is indicated by an arrow. The label at the respective arrow denotes the condition on which the state transition is effected or on which the state is maintained and not changed. The denomination "aveBFlevel" denotes the average buffer fill level of either data buffer, data transmission buffer or data reception buffer, depending on the exemplary embodiments described hereinabove. Thus, a corresponding state machine can be implemented in the evaluation module 15 or 25 independently for the data transmission buffer and/or data reception buffer, so that low rate traffic or high rate traffic, respectively, refers to a single traffic transmission direction only. Stated in other words, the fill level evaluation module 15 in FIG. 3 is an exemplary embodiment that may contain two state machines, one for the downlink transmission buffer, one for the uplink data reception buffer. However, with reference to FIG. 4, the fill level evaluation module 15 contains a single state machine only in that exemplary embodiment and another single state machine is used in the fill level evaluation module 25. Under the assumption that the state machine initially is in the "low rate traffic setup" state, the buffer fill level is compared with a reference value labeled To_highRateSetup. This means that if this threshold value is exceeded, the state is changed to the high rate traffic setup. Thus, assuming the state of low rate traffic setup, if the average buffer fill level is smaller or equal to the threshold named To_highRateSetup, the state remains unchanged and remains in the low rate traffic setup. If, on the other hand, the average buffer fill level is detected to be greater than the "to high rate setup" threshold value, the state changes to the high rate traffic setup state, in which the physical layer link adaptation control is setup to deal with high rate traffic (generally, in the application data transfer direction, while the low rate traffic setup typically is applicable in the application feedback direction). If in this high rate traffic setup state, the average buffer fill level is detected to be greater than or equal to the From_highRateSetup, the state remains unchanged in the high rate traffic setup. If, on the other hand, the average buffer fill level is detected to be less than the From_highRateSetup threshold value, the state transits from "high rate traffic setup" state to "low rate traffic setup" state, as illustrated in FIG. 5.

Thus, if the buffer or buffers are evaluated to handle low rate or high rate traffic, respectively, corresponding output signals from the fill level evaluation module 15, 25 will be output so as to instruct physical layer link adaptation control module 13, 23, respectively, to correspondingly adapt the physical layer link. That is, low rate traffic is configured in the application feedback direction distinctly from the high rate traffic occurring in the application data transfer direction. Thus, in those states, at least a modulation scheme and a coding scheme used for data transmission on the physical link layer are modified and/or tuned such that the resulting error rate probability for transmission in the application feedback direction is lower than the error rate probability for transmission in the application data transfer direction so as to obtain maximum capacity in the application data transfer direction and obtain optimum reliability in the application feedback direction.

Figure 6:
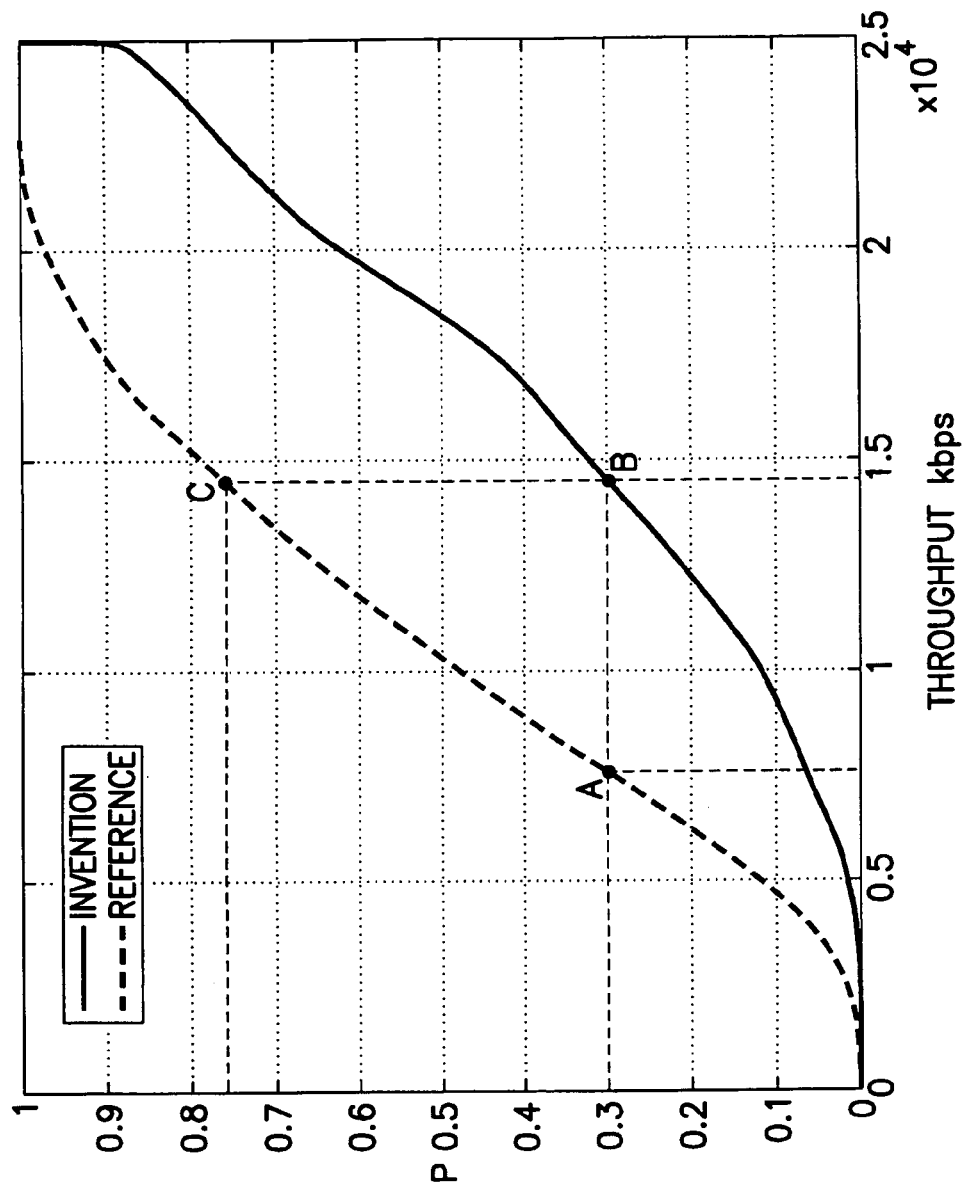
FIG. 6 shows a comparative characteristic of the cumulative density function (CDF) of the application throughput (in kbps, i.e. kBit/sec) for a conventional scenario as a reference and an exemplary embodiment of the invention exhibiting the beneficial effect of the invention.

FIG. 6 illustrates a comparative characteristic of the cumulative distribution function (CDF) of the application throughput (in kbps, i.e. kBit/sec) for a conventional scenario as a reference and an exemplary embodiment of the invention exhibiting the beneficial effect of the invention. Apparently, as will be understood from the explanation of the foregoing and the illustration in FIG. 6, increasing the robustness of small packets marginally degrades the physical layer capacity in one direction (the feedback path) but improves the general system robustness and application level throughput.

Namely, FIG. 6 depicts the throughput of a FTP file download from a network server as a transmitter into a mobile station or user equipment UE as a receiver.

In the dotted line characteristic labeled as "reference", it is assumed that an uplink UL packet error rate is driven to the same 10% error rate target as in the downlink, as in typical studies of Layer 1 discussed hereinbefore. In contrast thereto, in the bold solid line labeled as "invention", an uplink UL packet error rate is driven by physical layer link adaptations to almost 0%, e.g. approximately 1%, error rate target by setting the CQI constantly to $\frac{1}{10}$-rate coded QPSK, while the error rate in downlink direction is kept at the 10% target using the full CQI scale.

Considering points A, B, and C in FIG. 6, the effect of the invention will be more readily understood. Comparing points A and B reveals that the 30% of UEs that experience the most demanding radio conditions are able to almost double the application throughput by applying the adaptation method described in this paper. Comparing points C and B reveals that UEs experiencing lower data rate than the exemplary data rate is reduced from 75 to 30%.

Thus, according to the exemplary effect of the invention, cross-layer improvements are possible in that by performing link adaptation on the 3GPP RLC/MAC and physical layer in order to better support TCP protocol feedback, also performance on the application layer is improved. Namely, optimizing the link at MAC/physical layer also provides a more efficient system in the application layer point of view for efficient end-to-end performance.

Embodiments of the present invention may be implemented in software, hardware, application logic or a combination of software, hardware and application logic. The software, application logic and/or hardware may reside on the transmitter side, the receiver side or on both sides.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a Node_B or access point or computer or smart phone, with exemplary examples of such computers described and depicted in FIGS. 2 to 4 as transmitters and receivers, respectively.

The present invention relates in particular but without limitation to mobile communications, for example to WCDMA, LTE, WIMAX and WLAN environments and can advantageously be implemented in base stations/Node_B's, access points or user equipments or smart phones, or personal computers connectable to such networks.

A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
receiving user data for transmission over a physical link,
acquiring information about the user data, the acquired information including a fill level of at least one buffer temporarily storing the user data,
setting physical layer link adaptation parameters for the transmission based on the acquired information, wherein
the setting comprises selecting at least one of a modulation scheme and a coding scheme separately for the transmission of the user data in an application data transfer direction and for feedback related to the user data in an application feedback direction based on a comparison between the fill level and at least one threshold value, the at least one of the modulation scheme and the coding scheme being selected separately for the application data transfer direction and the application feedback direction such that throughput in the application data transfer direction is higher than throughput in the application feedback direction and error rate in the application data transfer direction is higher than error rate in the application feedback direction.

2. The method according to claim 1, wherein the acquiring comprises extracting information on at least a quality of service defined for the transmission and a direction of the transmission.

3. The method according to claim 1, wherein the acquiring comprises
calculating the fill level of the at least one buffer temporarily storing user data, and
deciding on the physical layer link adaptation parameters of the transmission based at least on comparing the fill level with the at least one threshold value.

4. The method according to claim 3, wherein the calculating comprises
measuring the fill level of the at least one buffer and filtering a currently measured fill level.

5. The method according to claim 4, wherein the filtering comprises using an infinite impulse response filter configured to smooth buffer fill level variations.

6. The method according to claim 3, wherein the deciding comprises comparing the fill level with two different threshold values configured to provide for hysteresis.

7. The method according to claim 1, wherein the at least one of the modulation scheme and the coding scheme being selected separately for the application data transfer direction and the application feedback direction such that the error rate for transmission in the application data transfer direction is set in a range from 5% to 30% and the error rate for transmission in the application feedback direction is set in a range from 0% to 5%.

8. The method according to claim 1, wherein the modulation scheme used for transmission of the feedback in the application feedback direction is limited to a low order modulation.

9. The method according to claim 1, wherein the coding scheme used for transmission of the feedback in the application feedback direction adopts one of a low data rate CQI, a CQI backoff scheme, a CQI fixed to ⅓ QPSK, and a CQI fixed to 1110 QPSK.

10. The method according to claim 1, wherein the application data transfer direction is a downlink direction from a transmitter to a receiver, and the application feedback direction is an uplink direction from the receiver to the transmitter.

11. A device, comprising:
circuitry configured to:
receive user data for transmission over a physical link,
acquire information about the transmission of the user data, the acquired information including a fill level of at least one buffer temporarily storing the user data,
set physical layer link adaption parameters for the transmission based at least on the acquired information, wherein
the circuitry is configured to select at least one of a modulation scheme and a coding scheme separately for the transmission of the user data in an application data transfer direction and for feedback related to the user data in an application feedback direction based on a comparison between the fill level and at least one threshold value, the at least one of the modulation scheme and the coding scheme being selected separately for the application data transfer direction and the application feedback direction such that the throughput in the application data transfer direction is higher than throughput in the application feedback direction and error rate in the application data transfer is higher than error rate in the application feedback direction.

12. The device according to claim 11, wherein the circuitry is configured to extract information on at least a quality of service defined for the transmission and a direction of the transmission.

13. The device according to claim 11, wherein the circuitry is configured to calculate the fill level of the at least one buffer temporarily storing the user data, and to decide on at least one of the physical layer link adaptation parameters of the transmission based at least on comparing the fill level with the at least one threshold value.

14. The device according to claim 13, wherein the circuitry is configured to measure the fill level of the buffer and to filter a currently measured fill level.

15. The device according to claim 14, wherein the circuitry is configured as an infinite impulse response filter configured to smooth buffer fill level variations.

16. The device according to claim 13, wherein the circuitry is configured to decide on the at least one of the physical layer link adaption parameters by comparing the fill level with two different threshold values configured to provide for hysteresis.

17. The device according to claim 11, wherein the application data transfer direction is a downlink direction from a transmitter to a receiver, and the application feedback direction is an uplink direction from the receiver to the transmitter.

18. A non-transitory computer-readable storage medium comprising computer-executable instructions which, when executed by a computer, cause the computer to execute a method comprising:
receiving user data for transmission over a physical link,
acquiring information about the transmission of the user data, the acquired information including a fill level of at least one buffer temporarily storing the user data,
setting physical layer link adaptation parameters for the transmission based at least on the acquired information, wherein
the setting comprises selecting at least one of a modulation scheme and a coding scheme separately for the transmission of the user data in an application data transfer direction and for feedback related to the user data in an application feedback direction based on a comparison between the fill level and at least one threshold value, the at least one of the modulation scheme and the coding scheme being selected separately for the application data transfer direction and the application feedback direction such that throughput in the application data transfer direction is higher than throughput in the application feedback direction and error rate in the application data transfer direction is higher than error rate in the application direction.

19. The non-transitory computer-readable storage medium according to claim 18, wherein the application data transfer direction is a downlink direction from a transmitter to a receiver, and the application feedback direction is an uplink direction from the receiver to the transmitter.

* * * * *

UNITED STATES PATENT AND TRADEMARK OFFICE
CERTIFICATE OF CORRECTION

PATENT NO. : 9,596,057 B2  
APPLICATION NO. : 12/932459  
DATED : March 14, 2017  
INVENTOR(S) : Karl Marko Juhani Lampinen et al.

Page 1 of 1

It is certified that error appears in the above-identified patent and that said Letters Patent is hereby corrected as shown below:

Column 15, Line 9, Claim 1 insert --transmission of the-- before "user data";
  Line 37, Claim 3 insert --the-- before "user".

Column 16, Line 40, Claim 14 insert --at least one-- before "buffer";
  Line 47, Claim 16 change "adaption" to --adaptation--.

Signed and Sealed this
Tenth Day of April, 2018

Andrei Iancu
*Director of the United States Patent and Trademark Office*